(No Model.) 5 Sheets—Sheet 1.

R. W. GRACE.
MACHINE FOR CUTTING RIGHT ANGLED STRUCTURAL SHAPES.

No. 479,066. Patented July 19, 1892.

WITNESSES. INVENTOR.

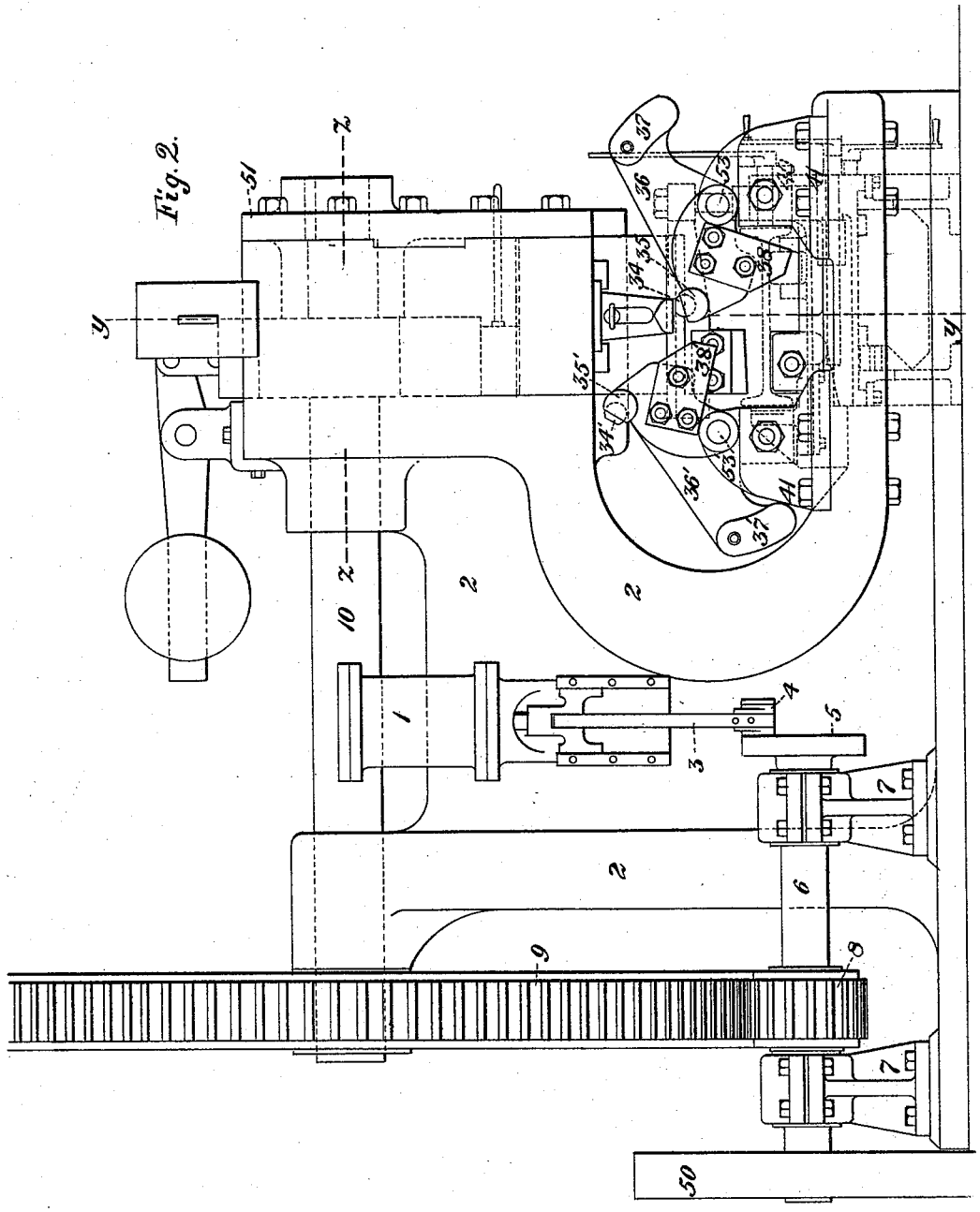

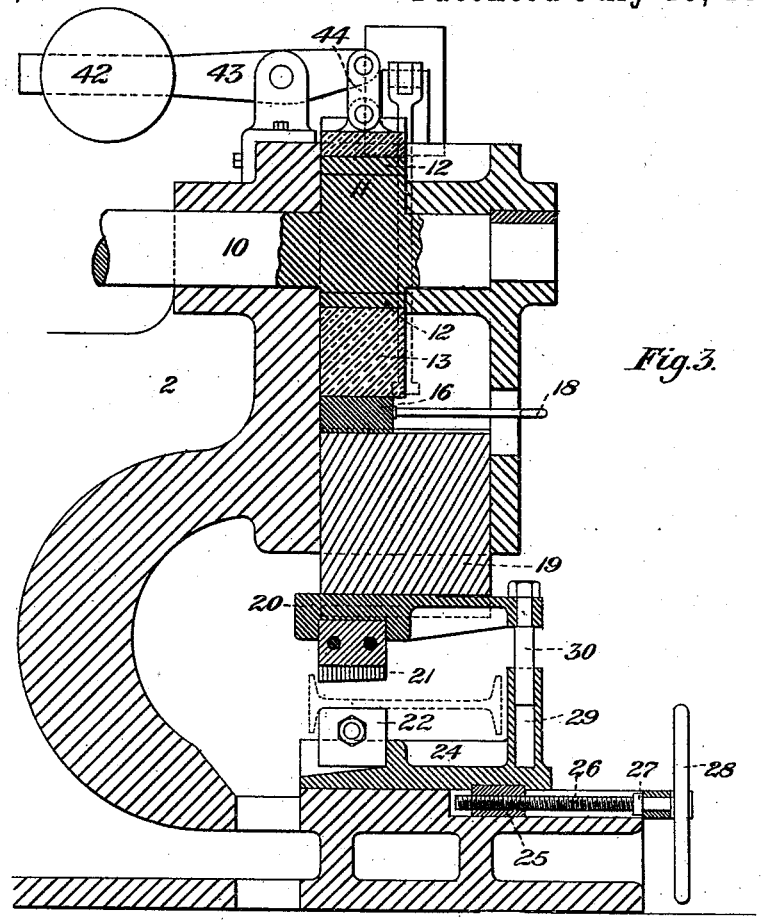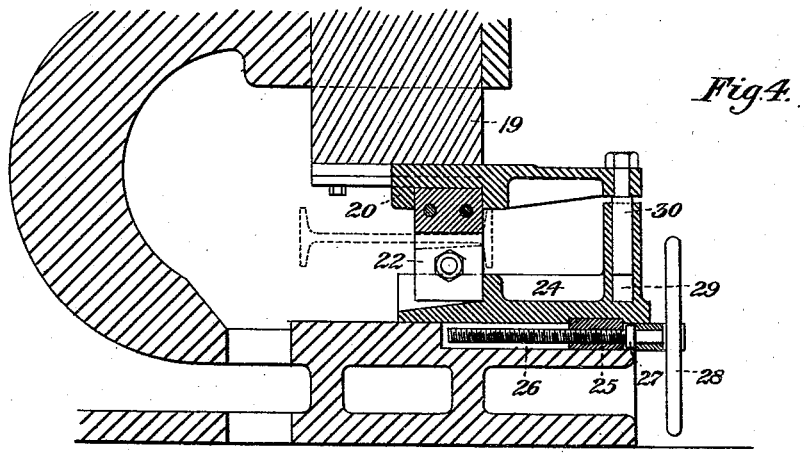

(No Model.) 5 Sheets—Sheet 4.

R. W. GRACE.
MACHINE FOR CUTTING RIGHT ANGLED STRUCTURAL SHAPES.

No. 479,066. Patented July 19, 1892.

WITNESSES.  INVENTOR.

(No Model.) 5 Sheets—Sheet 5.
R. W. GRACE.
MACHINE FOR CUTTING RIGHT ANGLED STRUCTURAL SHAPES.
No. 479,066. Patented July 19, 1892.
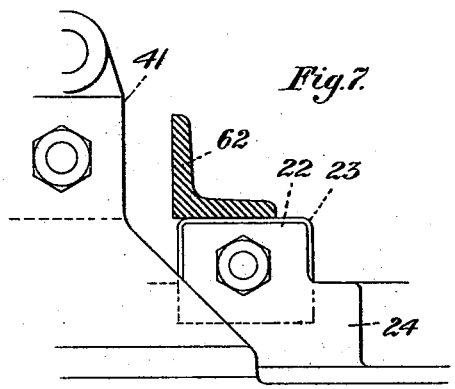
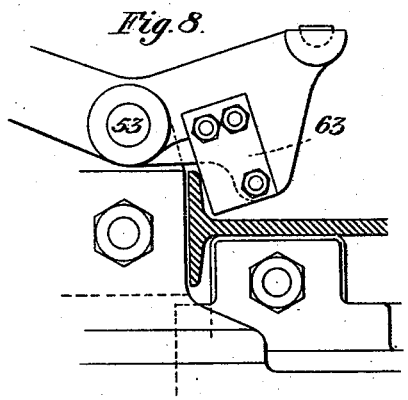
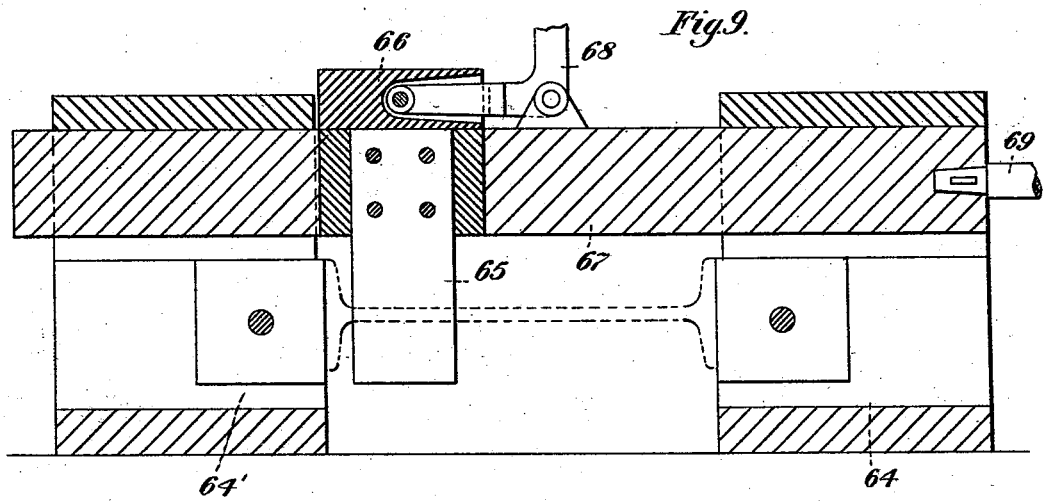
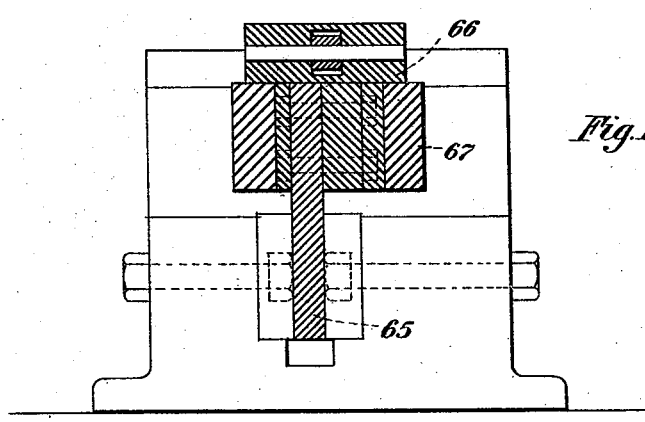
WITNESSES.
O. M. Clarke
Wm. L. Pierce
INVENTOR.
Robt. W. Grace.

UNITED STATES PATENT OFFICE.

ROBERT W. GRACE, OF PITTSBURG, ASSIGNOR OF ONE-HALF TO JOHN A. POTTER, OF MUNHALL, PENNSYLVANIA.

MACHINE FOR CUTTING RIGHT-ANGLED STRUCTURAL SHAPES.

SPECIFICATION forming part of Letters Patent No. 479,066, dated July 19, 1892.

Application filed May 16, 1890. Serial No. 352,052. (No model.)

*To all whom it may concern:*

Be it known that I, ROBERT W. GRACE, a citizen of Great Britain, residing at Pittsburg, in the county of Allegheny and State of Pennsylvania, have invented or discovered a certain new and useful Improvement in Machines for Cutting Right-Angled Structural Shapes, of which improvement the following is a specification.

The purpose of my invention, generally stated, is to devise machinery by which I-beams, channel-irons, and angle-irons of all descriptions may be sheared instead of cold-sawed, as at present practiced.

The advantages gained by my machine over cold-sawing are that the strain on the bearings, which is enormous in cold-sawing, is greatly reduced. Besides, the steam-power required for my machine is also much less than that necessary to drive a cold-saw. A low-speed engine may be used, while in cold-sawing a high-speed engine is needed to drive the rim of the saw frequently at a speed of twelve thousand feet per minute.

Both of the above facts result in a lessening of expenses for repairs and fuel.

Figure 1:
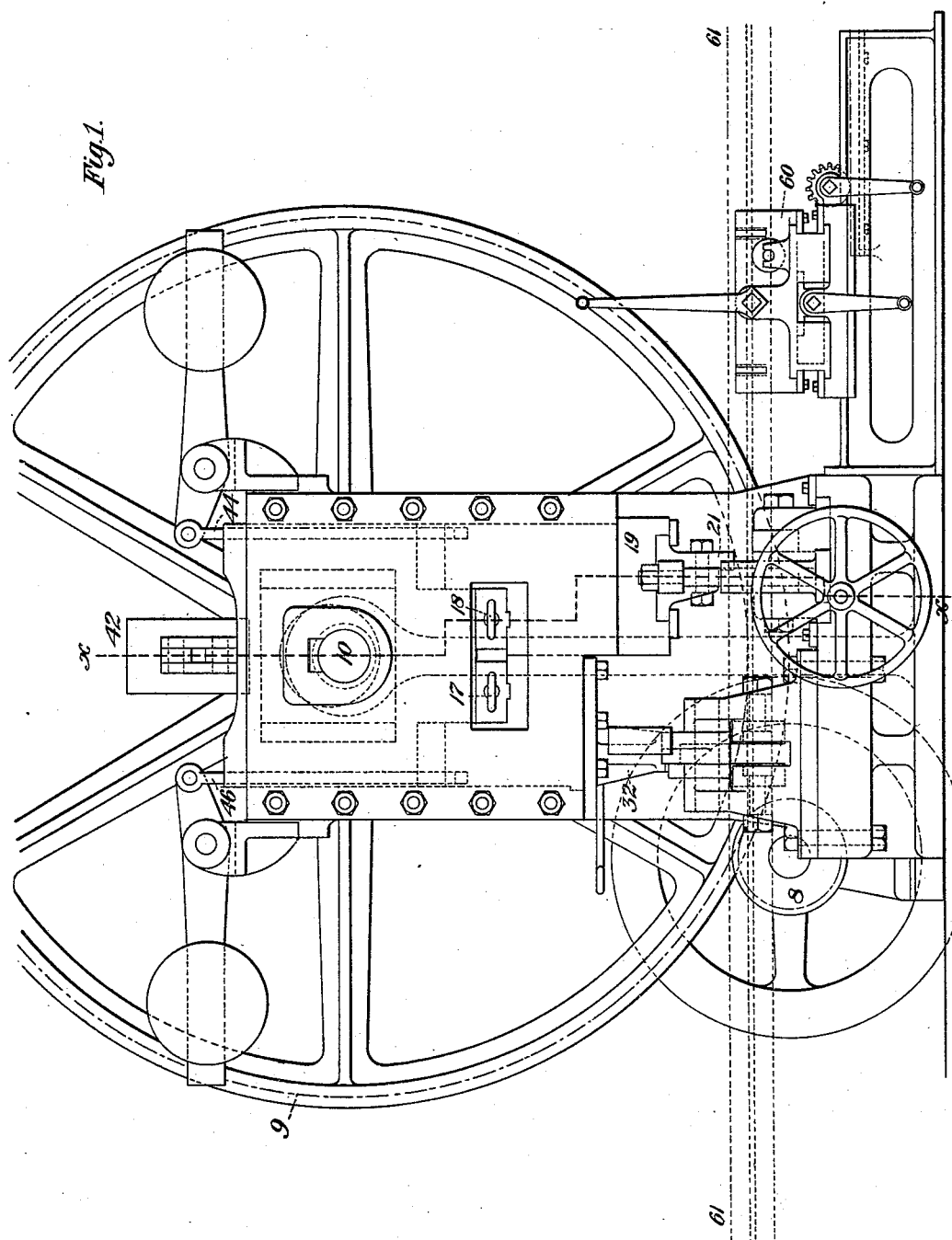
Figure 5:
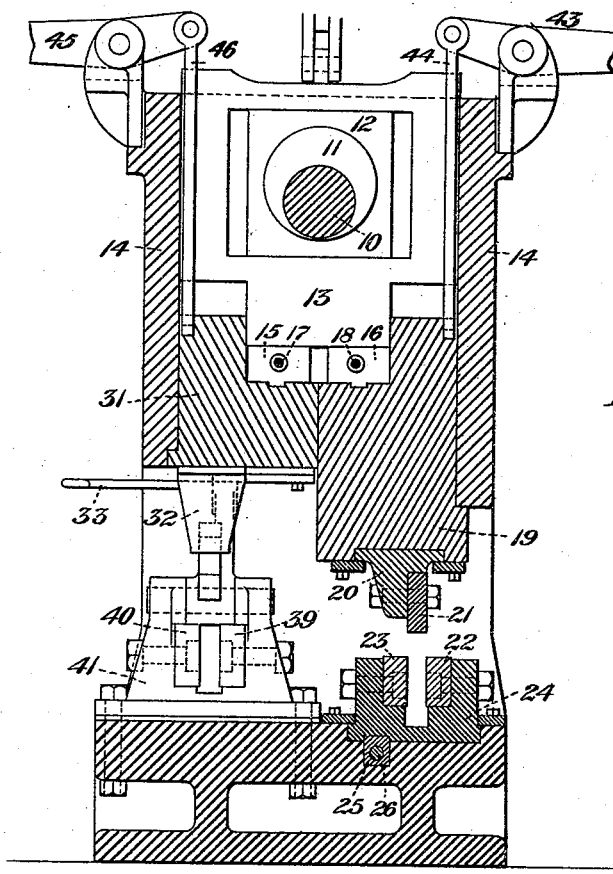
Figure 6:
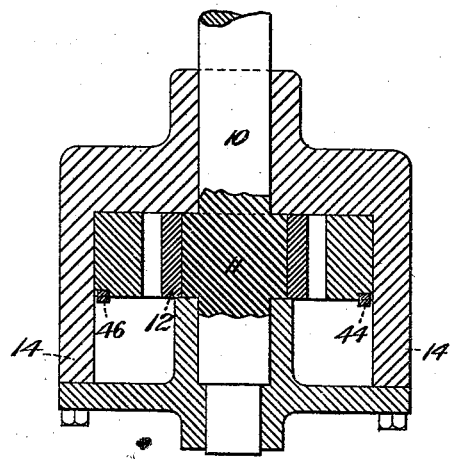

In the accompanying drawings, which make part of this specification, Figure 1 is a side elevation of the machine; Fig. 2, an elevation of the rear, assuming that the rail is fed in at the front of the machine; Fig. 3, a section on line $x$ $x$ of Fig. 1; Fig. 4, a like section on the lower end of said line, showing the upper shearing-knife pushed through the beam; Fig. 5, a section on line $y$ $y$ of Fig. 2; Fig. 6, a section on line $z$ $z$ of Fig. 2; Fig. 7, an elevation of the knife for cutting the angle-iron; Fig. 8, an elevation of a shortened knife for cutting a flange without entering web of an angle shape; Fig. 9, a vertical section of devices for straight-line cutting, and Fig. 10 a cross-section of the same.

The present machine illustrates the shearing of I-beams; but my invention is not restricted to shearing such shapes only.

Referring to Fig. 2, 1 is a cylinder bolted to the frame 2 of the machine, which is a single casting of the general contour seen in the several views. 3 is the piston-rod; 4, the wrist-pin; 5, the crank turning the shaft 6 in housings 7 7, bolted to the bed-plate of the frame 2. Shaft 6 has a pinion 8, driving the large spur-wheel 9, turning the shaft 10. 50 is the balance-wheel. 51 is a plate bolted to the frame 2.

Passing now to Fig. 5, on shaft 10 is an eccentric 11, turning in a slide-block 12, which reciprocates in an opening of the double-acting power-block 13, which slides in ways 14 14, cast with the frame 2 of the machine. At the base of said power-block 13 is the sliding gag-block 16, pushed in and out of position by the handle 18. (Seen in Fig. 3.) The gag-block 16 presses against the web-block 19, in the base of which slides the knife-holder 20, carrying the bolted upper knife 21. Beneath said knife 21 is an opening between two lower shearing-dies 22 and 23, both secured to a casting 24. The base of the casting 24, as seen in Fig. 3, is recessed to receive a block 25, in which turns a screw 26, having collar 27 and hand-wheel 28, by which said casting 24 may be advanced, as required. As seen in Fig. 3, from the knife-holder 20 a pin 30 projects downwardly to enter the socket 29 in the casting 24. By means of this engagement the upper and lower shears are moved simultaneously.

Still following Fig. 5, 15 is another sliding gag-block communicating power to flange-block 31, in which slides gag-block 32, moved by handle 33.

Returning to Fig. 2, 34 is a hardened-steel cylinder with flattened face, resting in a lug 35 of a tilting knife-holder 36, counterweighted at 37 and pivoted at 53 to a casting 41, which is bolted to frame 2. Recessed into and bolted to said knife-holder 36 is the knife-blade 38. The left-hand knife 38' has a like knife-holder with lug, counter-weight, and pivot, said knife-holder being pivoted to the same casting 41.

Returning to Fig. 5 for more distinct view, 39 and 40 are two bed-knives bolted to casting 41, bolted to frame 2, between which knives the knife 38 descends. Similar constructions occur with their left-hand bed-knives and their supporting-casting. 42 is a counter-weight at end of lever 43, pivoted to lever 44, fastened to power-block 13. The blocks 19 and 31 are also counterweighted in like manner. 60 is a feed-carriage of ordinary construction, having two motions at right angles to each other, by which the beam 61 is advanced and shifted laterally, as required. With the specific construction of this carriage my invention has nothing to do.

In Fig. 7 the relative positions of the knives are shown as changed to adapt them to cut an angle-iron 62.

In Fig. 8 the upper shearing-knife is shown as shortened to adapt it to a particular method of shearing described below.

The knives which cut the shapes shown in Figs. 7 and 8 occupy the same position in and are connected to the general machine in the same way as the upper knives. (Seen in Fig. 2.)

In Figs. 9 and 10, 67 is an operating-arm sliding in suitable guides in knife-holders 64 and 64'. Said operating-arm 67 has a suitable opening for knife-holder 66, into which holder is bolted the knife 65. Said knife-holder 66 is shown in Fig. 9 in position for cutting. 68 is a lever for lifting the knife-holder 66 clear of the shape to be cut. The arm 67 may be operated by a hydraulic cylinder, of which the rod 69 is shown, or by other suitable means. The hydraulic cylinder would be bolted, preferably, to the casting 41, and the cutting off of the flanges takes place in substantially the same place on the bed of the machine as occurs with the mechanism shown in Figs. 1 to 6.

Operation: The I-beam 61 is securely gripped in the carriage 60 and advanced beneath the knife 21. The gag 16 is moved into position beneath the power-block 13, as shown in Fig. 3, the gag-block 15 being out of position. The knife 21 descends, removing a portion of the web. The knife 21 then rises, and during the period in which the knife 21 is clear of the web the lower and upper knives are laterally adjusted by means of hand-wheel 28 and screw 26. The operation of shearing is continued until the web is severed. The gag-block 16 is then slid out of position, preventing the descent of the block 19. The shape is then advanced until the aperture cut in the web comes directly in the plane of knives 38 and 38', gag-block 32 being slid back into a position opposite to that shown in Fig. 5. The knife 38 is dropped into position in the slot shown in Fig. 2, the flange of the beam being, as shown in Fig. 2, close against knives 39 and 40. The gag-block 32 is then slid into position, as shown in Fig. 5. The gag-block 15 is then slid into operating position beneath the power-block 13 and the flange is severed, gag-block 32 tilting the knife-holder by direct contact therewith or with the hardened-steel cylinder, as seen in Fig. 2. The gag-block 32 is then slid back out of position and the knife-holder 36 swung out of the slot. The shape is then moved so that the uncut flange comes close against the left-hand bed-knives.

The operation above described of cutting the first flange is repeated upon the second flange, thereby completely severing the beam.

The first operation described relative to cutting the web of the I-beam will take place in cutting that portion of the angle-iron 62 resting on knives 22 and 23 in Fig. 7, the remaining portion of the shape being cut as described in the operation of cutting the flanges of an I-beam, with the exception that only one cut is required.

The operation of the devices shown in Figs. 9 and 10 is as follows: The aperture having been cut in the web of the shape, here, for illustration, of an I-beam, said shape is advanced from beneath knife 21 until the aperture comes underneath knife 65. Knife 65 is then lowered into said aperture, and the bar 67 is then operated to cut one flange. The bar is then moved over to cut the other flange.

In Fig. 8 is shown a form of knife in the holders 36 and 36' adapted to cutting a shape in which a portion of the flange is first removed. In the case of an I-beam here shown five operations would be required to cut off the four corners, the last operation being to sever the web. The beam in this method is changed around and reversed, as required, to cut off the separate corners and the remaining web.

Having fully described my invention, I claim—

1. In a machine for severing I-beams, channels, angles, and other merchant shapes, the combination of a power-block sliding in guides, a gag-block at the base of said power-block, a web-block carrying the upper knife-blade, and two bed-knives between which said upper knife-blade descends, substantially as shown, and for the purposes set forth.

2. In a machine for severing I-beams, channels, angles, and other merchant shapes, the combination of a power-block sliding in guides, a gag-block at the base of said power-block, a flange-block, a gag-block at the base of said flange-block to communicate power to a tilting knife-holder carrying an upper knife, and two bed-knives between which said upper knife descends, substantially as shown, and for the purposes described.

3. In a machine for severing I-beams, channels, angles, and other merchant shapes, the combination of a power-block, devices for communicating power therefrom to a web-block and to a flange-block, a web-block carrying the upper knife, bed knives between which said upper knife descends, a flange-block, means for communicating power from said flange-block to a tilting knife-holder, said tilting knife-holder carrying the upper knife, and two bed-knives between which said upper knife descends, substantially as shown, and for the purposes set forth.

In testimony whereof I have hereunto set my hand.

ROBERT W. GRACE.

Witnesses:
CHAS. M. JOHNSTON,
WM. M. PIERCE.